July 11, 1961  R. T. A. COLEMAN  2,991,564
EDUCATIONAL DEVICE
Filed Nov. 13, 1958

Richard T. A. Coleman
INVENTOR.

United States Patent Office 2,991,564
Patented July 11, 1961

2,991,564
EDUCATIONAL DEVICE
Richard T. A. Coleman, 24 Parkwood Ave.,
Charleston, S.C.
Filed Nov. 13, 1958, Ser. No. 773,660
2 Claims. (Cl. 35—31)

The present invention generally relates to an educational device and more particularly to such a device for teaching children the four major processes of arithmetic, addition, subtraction, multiplication, and division, after having first made plain to them how to count.

The primary object of the present invention is to provide a board of a novel structural arrangement for teaching children, from kindergarten through the fourth grade or beyond, how to count with meaning, that is with a grasp of the value of numbers from 1 to 100 and, with this understanding complete, to show them how to progress through the processes of addition, subtraction, multiplication and division so that number confusion is avoided at the start and number understanding is developed until fully grasped. A child using the present invention will learn quickly through a repeating of each process for himself as he sees, and says what he does as he makes his answer himself, step-by-step. This is a highly effective educational device for use by a child in the major fundamental processes of arithmetic.

A further object of the present invention is to provide an educational device in the form of a board employing windows with a hinged shutter arrangement whereby the windows may be either opened or closed and employing a color system with there being 100 windows with ten windows in each row and then rows of windows with all of the windows in one horizontal row being the same color and all of the horizontal rows of windows below the first row having a different color for each row.

Another important object of the present invention is to provide an educational device in accordance with the preceding objects in which a check line of windows is provided which also has hinged shutters for which is used in checking the solution to the arithmetical problems.

Another object of the present invention is to provide an educational device which is simple in construction, easy to use, effective for its particular purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now specifically to the drawings, the numeral 10 generally designates the educational device of the present invention which is in the form of an enlarged square board 12 having a plurality of rectangular recesses which may be termed windows and designated by the numeral 14 therein with the windows or recesses 14 being arranged in horizontal and vertical rows with each horizontal row having ten windows and each vertical row having ten windows.

Figure 1:
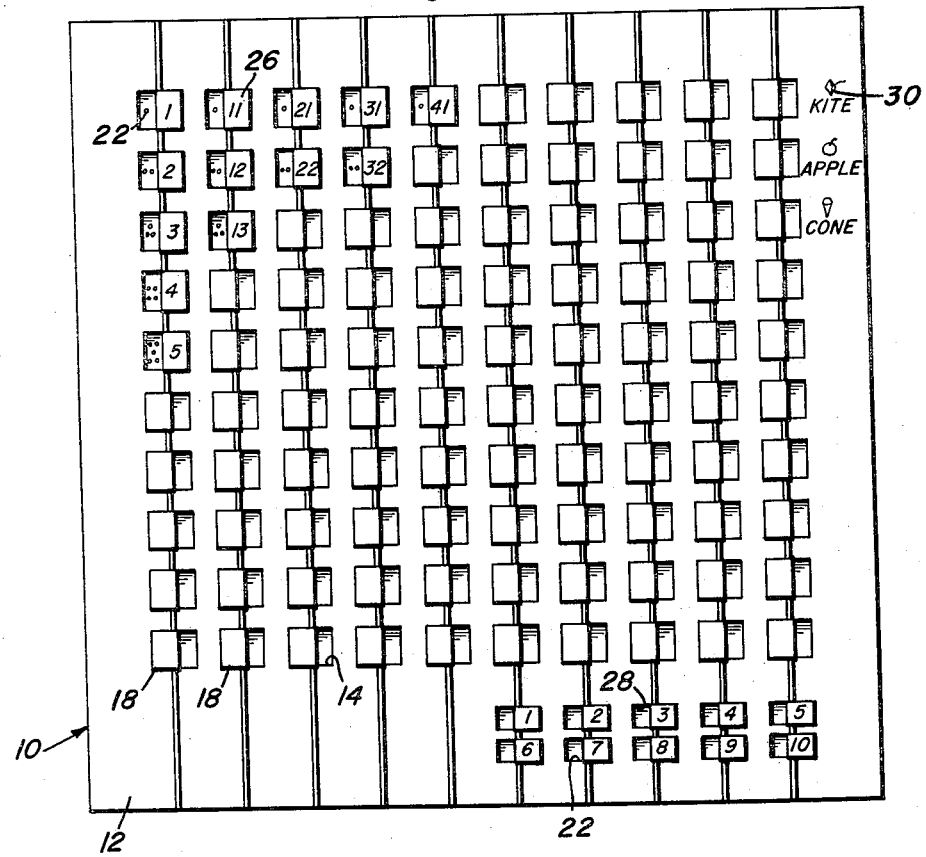
FIGURE 1 is a plan view of the board employed as an educational device with part of the numerical indicia omitted for purposes of clarity.
Figure 2:
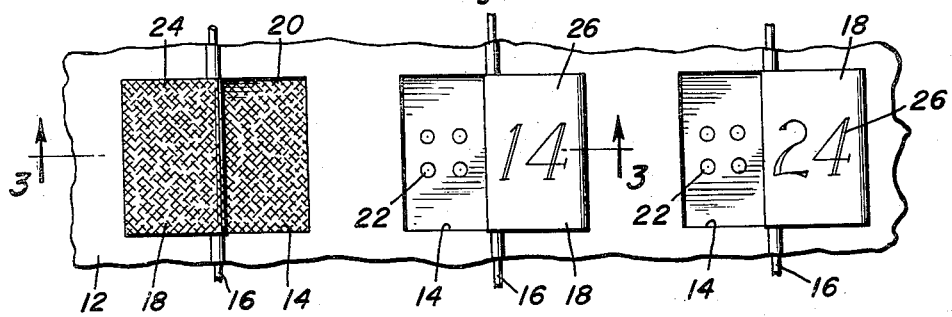
FIGURE 2 is an enlarged plan view of one section of the board illustrating the structure thereof.
Figure 3:
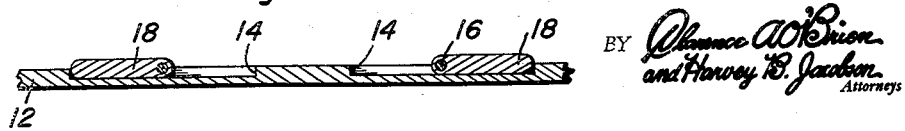
FIGURE 3 is a sectional view taken substantially upon a plane passing along section line 3—3 of FIGURE 2 illustrating the construction of the windows and shutters.

Extending vertically through the board is an elongated wire rod 16 in each vertical row with the wire rod 16 extending through the recess 14 generally at the center thereof and within each recess 14 is a shutter 18 hingedly mounted on the wire rod 16 for movement about an axis defined thereby with the shutter 18 covering one-half of the recess or window 14 so that the shutter may move from a closed position as shown in the left hand portion of FIGURES 2 and 3 to an open position as shown in the right hand portion of FIGURES 2 and 3.

The recess 14 has the right hand portion thereof provided with a color 20 and has the left hand portion thereof provided with dots 22 of a predetermined number which are in contrasting relation to the background of this part of the recess 14. The shutter 18 is provided with color 24 on one face thereof and a number 26 on the other face thereof whereby when the shutter 18 is closed, the colored area 20 and colored area 24 will be coextensive thus providing a solid color for the recess or window. When the shutter 18 is open, then the number 26 will be revealed as will be the dots 22 which indicate the unit digit of number 26 for enabling a visual indication of the significance of the unit digit. Adjacent the lower right hand corner of the board 12 is a plurality of check windows 28 which are the same as the windows or recesses 14 except that they do not have as much vertical height. Also, each horizontal row of windows 14 is provided with designating indicia in the form of pictorial indicia and written descriptive indicia as designated by the numeral 30 with the first row being designated the kite row and having an illustration of a kite and the word written thereunder. The second row is apple with the same showing an apple and having the word apple written thereunder and this designation continues down the horizontally arranged rows. The coloring of the areas 20 and 24 may be compatible with the indicia 30, that is the apple row could be colored red while there could be an orange row colored orange and provided with the indica of an orange. This coloring arrangement will be carried throughout the rows of windows and recesses.

It is noted that the shutters are so arranged that the numeral is revealed when it has been flipped to the right. This is so that addition is made from left to right and subtraction is done from right to left. This is in keeping with all natural numbers increasing on horizontal lines as one goes from left to right. The shutter may be of a single flat piece of metal, plastic or wood while the board could be constructed of thick cardboard or the like.

To add, let as take the problem of two plus two. With all of the shutters in closed position, the child first opens shutters 1 and 2 on the first vertical line. Then he adds two to the already opened shutters by opening two more windows on the vertical line and the last number that he sees is four which is the answer. He counts the open shutters and sees that they are now four so that he makes two plus two equal four and sees that number on the last black shutter. He takes away five from eight open shutters by closing five shutters and sees that three shutters are left and that the last open shutter in the line is marked with a three which is the answer. In multiplication, as in four times three, he opens the first three windows in the first vertical line and then the following set of three, then the next set of three and then the next set of three and so on that when he has produced four sets of three open shutters and counts them with his fingers he sees that he now has twelve and twelve, the answer, appears on the last opened shutter. On the check line, the child may record each time he closes or opens a set of shutters. For another example, as the child multiplies five times four, each time he opened a set of four he checks it with his right hand at the bottom of the board by saying one, two three, four one time and closes the check window one and so on until he has multiplied five times four and he sees on the check line five opened shutters. He sees on the working lines in the 100 section 20 open shutters beginning at 1 and ending with 20. He has written down his problem 5×4= and having closed sets of four shutters, in proper sequence, 5 times which will be shown on the check line, he has made his answer and sees the full product of his multiplication not only on the last shutter with its 20 thereon but sees all 20 shutters that it took to make that answer. He then writes the answer to his problem 5×4=20. In working this problem, by using the actual numbers of things involved in it, he notes as he opens the check window 1, saying 4 one time, that 4 times 1 is 4; that when he opens check window two, saying four two times that four times 2 is 8, so that in the working of every problem of multiplication and division the child sees the making not only of the ultimate answer but sees again and again the steps of the multiplication table before the final product is reached. The number of things involved in every problem are there before him. He has to use them to get his answer. This device is a living multiplication table, since this device uses nine counters for the number 9 and the answer is made by the child by using the actual number of things it is made up of. This is of great importance, since the child deals not with words about numbers, but with the very number of things involved in his problem of addition, subtraction, multiplication, and division. Since understanding cannot help but follow the repeated use of the actual number of things, and since this device is not merely a memorization tool but teaches the child to remember because he has made the sum, the difference, the quotient, and the product, and he remembers because he understands, he knows.

In division, a five into fifteen for instance, he will open the 15 shutters he has to begin with and as he closes each group of five, one by one, he opens a check shutter so that when all of the original 15 are closed in, there are 3 open shutters on the check line. This backwards method, going from 15 back through 1 shows the relationship of division to substraction. Going forward in division the multiplication table goes through its orderly course again. As in the same problem of five into fifteen the child opens the first 5 windows and uses the check line as he does in multiplication saying 5 one time, and continuing, in proper sequence, until he has opened 15 windows and therefore 15 shutters are before him with the number 15 on the last, and 3 on the check line. The remainder is shown on this device when a number is divided into a number in which it will not go evenly, and the remainder is there at the end whether one uses the forward or backward method of division. Forty-nine divided by eight will prove that the answer is six and one left over. All problems of addition, subtraction, multiplication and division are therefore checkable each in its own way, so that the child makes the answer by opening and closing the shutters in the 100 working lines and keeps track of what he is doing on the check line. In every problem the answer can be checked by counting the actual number of shutters involved in the problem. If the correct number of shutters have been used, the answer is correct. The child cannot use the very number of shutters involved in the problem and reach an incorrect answer if he uses them in their correct sequence. The relationships of the processes, and the relationships of the numbers themselves reveal arithmetic's magic over and over until it belongs to the child for good.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. An educational device comprising an enlarged rectangular board having a planar upper surface with a plurality of recesses therein, said recesses being disposed in a plurality of longitudinally spaced and aligned transverse rows, a plurality of parallel longitudinal wire rods carried by said board and extending centrally through said recesses, a plurality of shutters hingedly mounted on each rod with each recess having a shutter, each shutter being one-half the size of its recess for covering one-half of the recess and revealing one-half of the recess in each of its pivoted positions, one surface of each shutter having numerical indicia thereon with the numerical indicia being arranged sequentally in longitudinal rows, the other surface of each shutter being colored, the one-half of a recess being revealed when its shutter is pivoted to a position revealing the numerical indicia thereon having dot-like indicia thereon with the number of dots being equal to the numerical value of the unit digit of the number disposed on the shutter, the other one-half of each recess being colored the same color as the other surface of the shuter, said recesses being arranged in ten transverse rows with the shutters facilitating the illustration of various mathematical operations, all of the colored surfaces of the shutters and recesses in one horizontal row being the same color, the color of the colored surfaces of different horizontal rows of recesses and shutters being distinguishable.

2. The structure as defined in claim 1 wherein said playing board is provided with pictorial indicia and descriptive indicia alongside of each horizontal row of recesses and shutters, for identifying the horizontal rows.

References Cited in the file of this patent

UNITED STATES PATENTS

| | | |
|---|---|---|
| 2,453,265 | Robinson | Nov. 9, 1948 |

FOREIGN PATENTS

| | | |
|---|---|---|
| 182,607 | Germany | Aug. 10, 1906 |
| 874,518 | Germany | Apr. 23, 1953 |
| 284,116 | Switzerland | Nov. 1, 1952 |
| 312,239 | Switzerland | Feb. 29, 1956 |